US011556387B2

(12) United States Patent
Yang et al.

(10) Patent No.: US 11,556,387 B2
(45) Date of Patent: Jan. 17, 2023

(54) SCHEDULING JOBS

(71) Applicant: International Business Machines Corporation, Armonk, NY (US)

(72) Inventors: Hong Wei Yang, Beijing (CN); Ming Liang Zu, Beijing (CN); Rong Song Shen, Haidian (CN); Xiao Dong Wang, Beijing (CN); Yang Yan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 17/111,315

(22) Filed: Dec. 3, 2020

(65) Prior Publication Data

US 2022/0179709 A1 Jun. 9, 2022

(51) Int. Cl.
G06F 9/46 (2006.01)
G06F 9/50 (2006.01)
G06F 9/48 (2006.01)

(52) U.S. Cl.
CPC .......... G06F 9/5038 (2013.01); G06F 9/4887 (2013.01)

(58) Field of Classification Search
CPC .............................. G06F 9/5038; G06F 9/4887
See application file for complete search history.

(56) References Cited

U.S. PATENT DOCUMENTS

| 8,261,283 | B2 | 9/2012 | Tsafrir et al. |
| 8,689,220 | B2 | 4/2014 | Prabhakar et al. |
| 9,569,262 | B2 | 2/2017 | Modani et al. |
| 9,983,907 | B2 | 5/2018 | Li et al. |
| 2007/0143765 | A1 | 6/2007 | Aridor et al. |
| 2015/0199218 | A1 | 7/2015 | Wilson et al. |
| 2020/0264928 | A1 | 8/2020 | Kalmuk et al. |

OTHER PUBLICATIONS

Anderson, D., et al., "Machine Learning for Predictive Analytics of Compute Cluster Jobs", arXiv:1806.01116v1, May 20, 2018, 7 pp.
Anonymous, "Mainfiame Batch Analytics with Machine Learning—Adding a New Workload Based on System Resource Availability", IP.Com No. IPCOM000259108D, Jul. 12, 2019, 5 pp.
Anonymous, "Prediction of Job Resource Usage Based on Large Amount of Historical Data", IP.Com No. IPCOM000248232D, Nov. 10, 2016, pp.

(Continued)

*Primary Examiner* — Gregory A Kessler
(74) *Attorney, Agent, or Firm* — Konrad Raynes Davda & Victor LLP; Rabindranath Dutta

(57) ABSTRACT

Provided are methods, systems, computer program products for scheduling jobs. The method may include receiving a request for allocating resources for a first job, a job comprising information regarding maximum amount of resources required by the job; determining a type of the first job; obtaining at least one backfill of the first job based on the determined type; allocating the maximum amount of resources from system resources to the first job; searching a second job in waiting jobs to be allocated resources, the second job being suitable to be allocated used resources by the first job from the maximum amount of resources allocated to the first job during the at least one backfill; allocating the resources unused by the first job from the maximum amount of resources allocated to the first job to the second job in response to the first job running to the at least one backfill.

20 Claims, 6 Drawing Sheets

(56) References Cited

OTHER PUBLICATIONS

Gaussier, E., et al., "Improving Backfilling by Using Machine Learning to Predict Running Times", SuperComputing 2015, Nov. 2015, 11 pp.

Hafshejani, Z.M., et al., "An Efficient Method for Improving Backfill Job Scheduling Algorithm in Cluster Computing Systems", Proceedings of the International Journal of Soft Computing and Software Engineering, Mar. 2013, 8 pp.

Matsunaga, A., et al., "On the Use of Machine Learning to Predict the Time and Resources Consumed by Applications", Proceedings of the 2010 10th IEEE/ACM International Conference on Cluster, Cloud and Grid Computing, 2010, 10 pp.

SCHEDULING JOBS

BACKGROUND

The present disclosure relates to computer techniques, and more specifically, to methods, systems and computer program products for scheduling jobs.

A computing system comprises a plurality of resources. The resources can be a single one or a composition from a group of: CPU, GPU, memory, software licenses, network bandwidth, disk and the like, which need to be allocated to jobs received by the system. A job is a software program which runs on the system by utilizing allocated resources. When the system receives a plurality of jobs, a job scheduler may allocate resources reasonably for each job, so that limited resources can be fully used by the system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, there is provided a computer-implemented method for scheduling jobs. The method may include receiving a request for allocating resources for a first job, a job comprising information regarding maximum amount of resources required by the job. The method may include determining a type of the first job. The method may include obtaining at least one backfill of the first job based on the determined type. The method may include allocating the maximum amount of resources from system resources to the first job. The method may include searching a second job in waiting jobs to be allocated resources, the second job being suitable to be allocated resources unused by the first job from the maximum amount of resources allocated to the first job during the at least one backfill. The method may include allocating the resources unused by the first job from the maximum amount of resources allocated to the first job to the second job in response to the first job running to the at least one backfill.

According to a second aspect of the present disclosure, there is provided a system. The system comprising one or more processors, a memory coupled to at least one of the processors; and a set of computer program instructions stored in the memory and executed by at least one of the processors in order to perform actions of the above method.

According to a third aspect of the present disclosure, there is provided a computer program product. The computer program product comprising a computer readable storage medium having program instructions stored thereon, the program instructions executable by one or more processors in a load balancer cluster which comprises a plurality of load balancers and an assistant, to cause the one or more processors to perform actions of the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
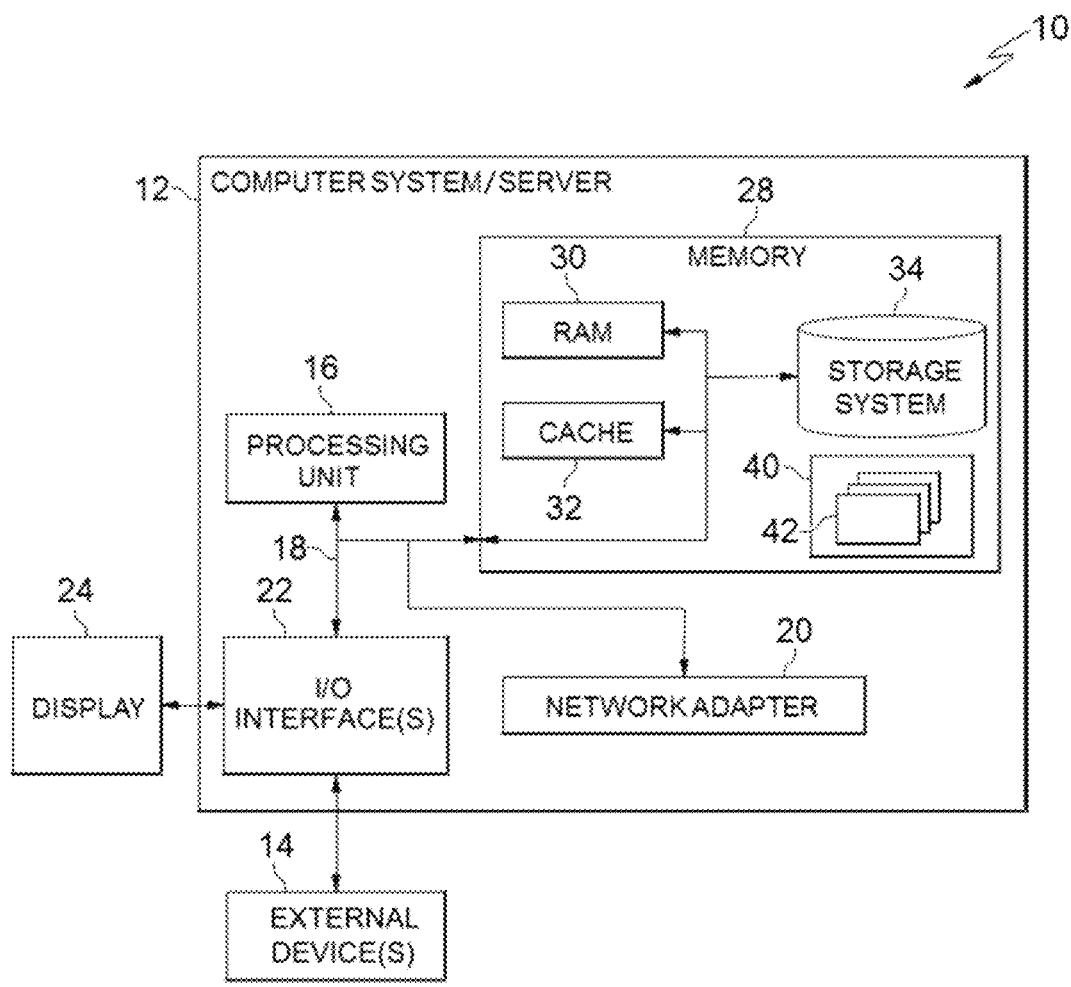
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
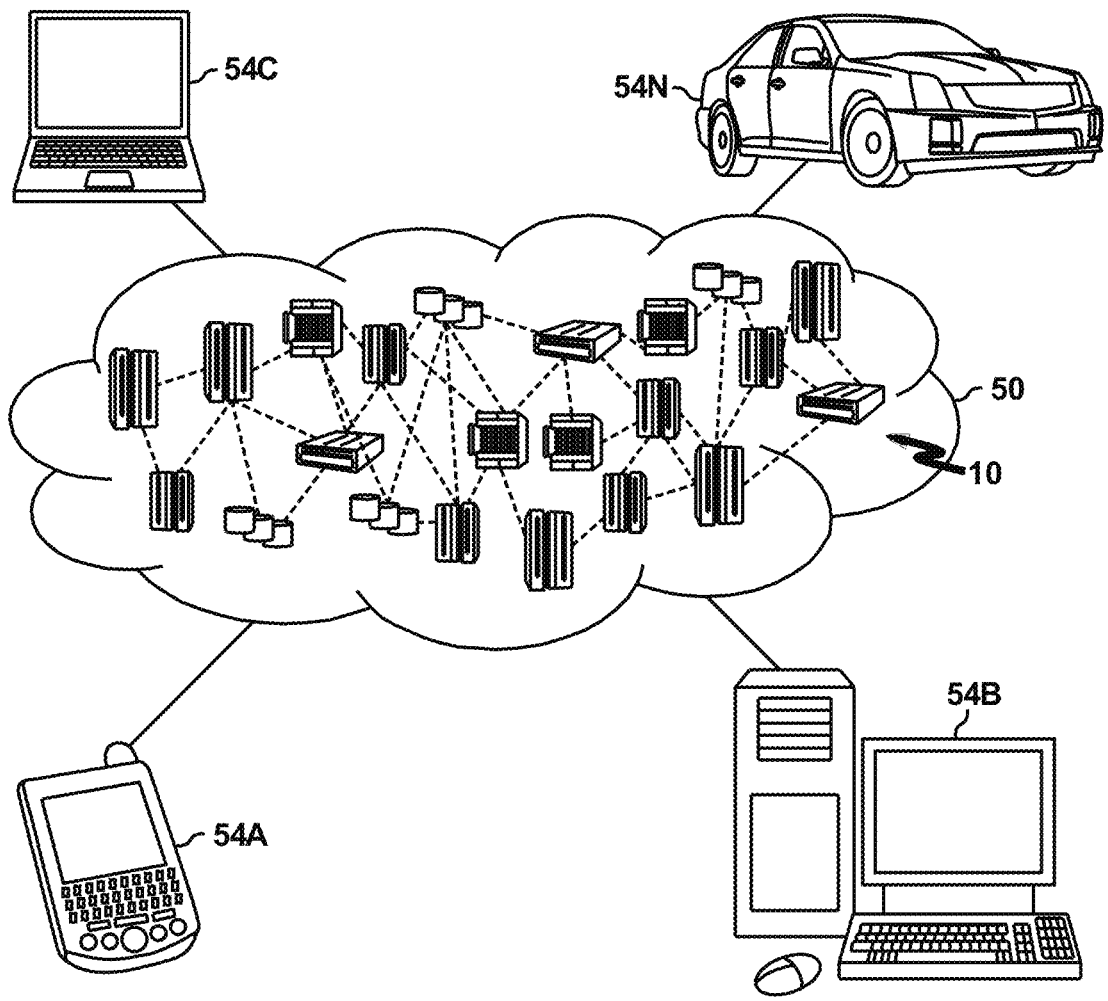
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
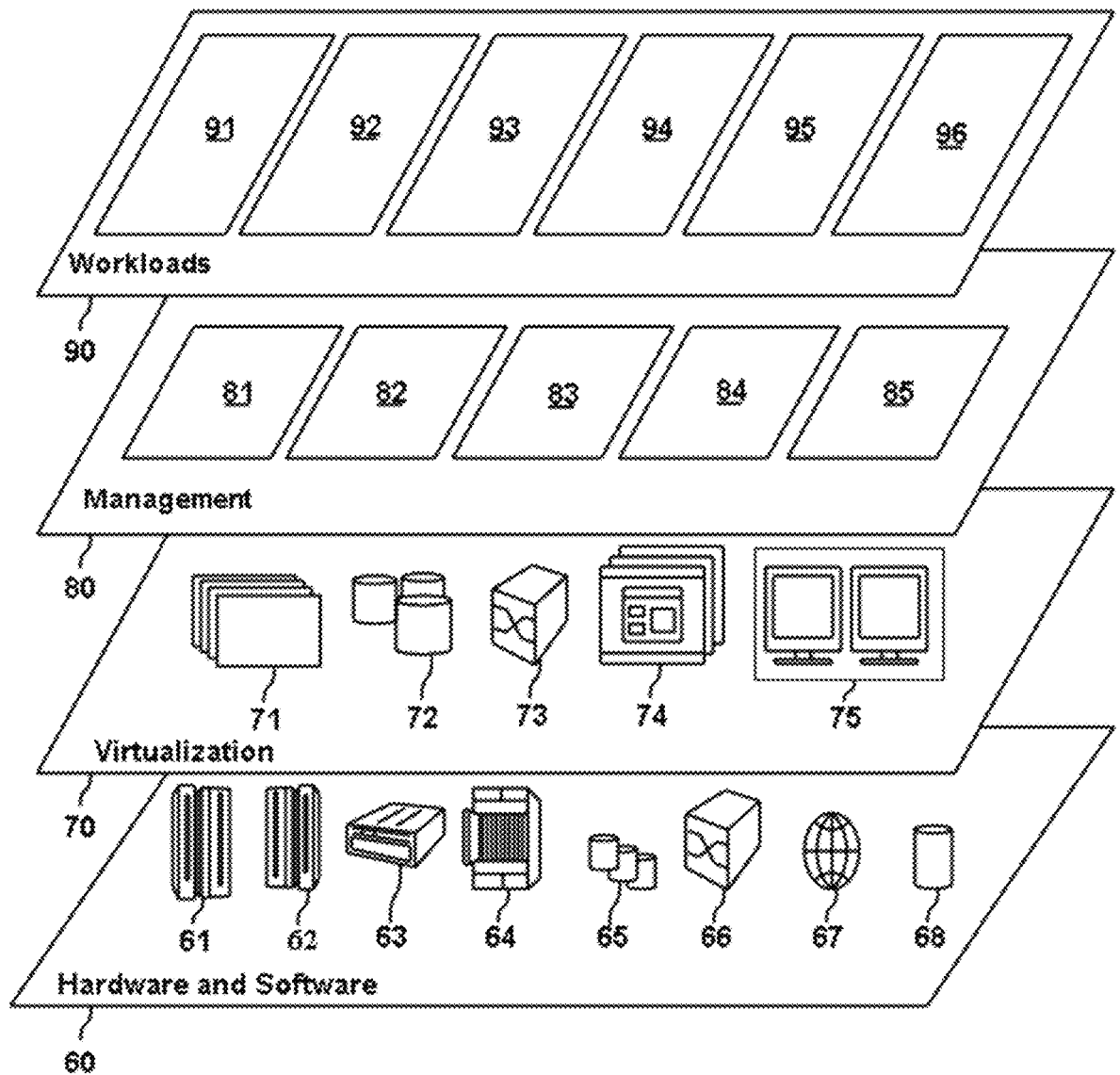
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and job scheduling 96.

There are a lot of existing job scheduling algorithms. However, resources required by a job over time in these algorithms are static, e.g. the job's resource consumption during its life cycle is unchangeable from time to time. In these algorithms, when a user submits a job, the user may specify the maximum amount of resources (M) required by the job. Then a job scheduler allocates resources for the job based on the maximum amount of resources (M) from resources comprised in the system. Generally, the job scheduler has a counter of current remaining amount of resources (N) for one kind of resource. If the maximum amount of resources (M) required by the job is less than or equal to the remaining amount of resources (N), e.g. $M<=N$, the job scheduler decreases the counter N by M by allocating the maximum amount of resources (M) from the remaining amount of resources (N) to the job and instructs the system to run the job. Here M and N may be a vector comprising amount of at least one kind of resource, such as number of CPU, GPU, percentage of memory, number of software licenses, network bandwidth, number of disk, and the like; and $M<=N$ means each element in M is less than or equal to corresponding element in N. A more advanced algorithm makes use of the backfill between two jobs to schedule a job which needs less resource and/or less time.

But resources required by a job over time is actually not static but dynamic, e.g. the job's resource consumption during its life cycle varies from time to time. For example, the resources required by the job are 2 CPUs and 20% memory for the first hour; 4 CPUs, 40% memory for the second hour and so on. At any given time, its resource consumption cannot exceed the maximum amount of resources required (M) by the job. If the job actually uses amount of resources (K), which is less than or equal to the maximum amount of resources required (M) for a long time, the amount of resources (M−K) allocated for the job are wasted.

Figure 4A:
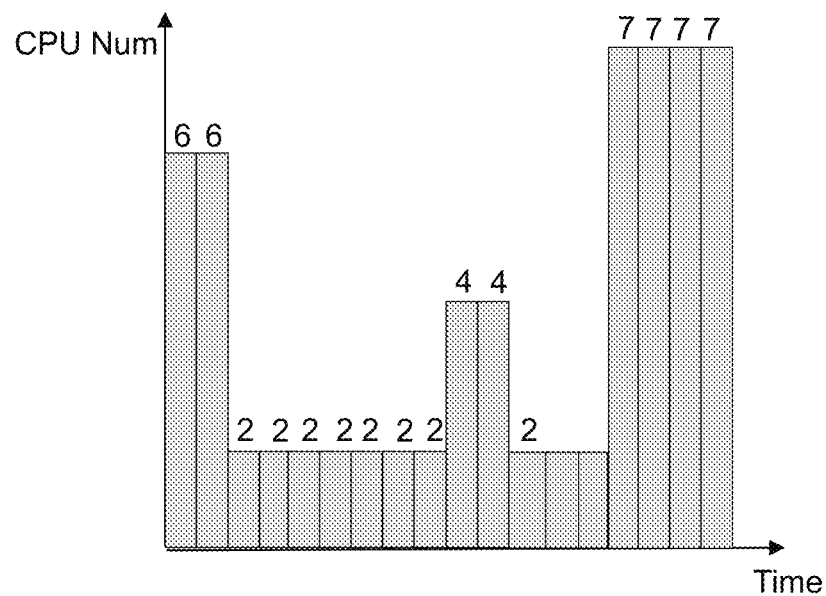
FIG. 4a depicts a graphic of exemplary number of CPU used by a job over time according to some embodiments of the present invention.
Figure 4B:
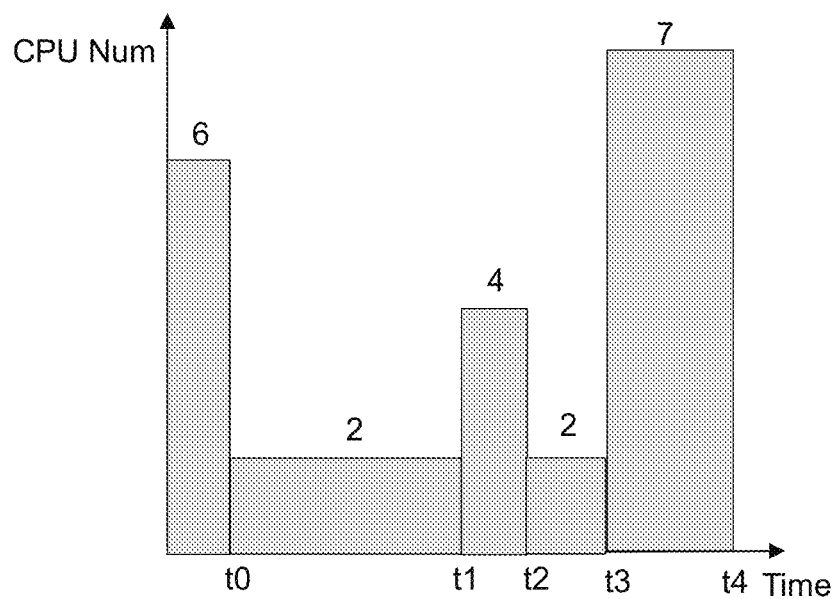
FIG. 4b depicts a diagram obtained from the graphic shown in FIG. 4a according to some embodiments of the present invention.

The amount of resources used by jobs over time can be monitored and recorded. In some embodiments, the amount of resources used by a job can be depicted into a diagram. In the following description, number of CPUs is taken as an example of amount of a kind of resource. FIG. 4a depicts a graphic of exemplary number of CPUs used by a job over time according to some embodiments of the present invention. The horizontal axis represents monitoring time after the job starts running, and the vertical axis represents the number of CPUs used at the corresponding monitoring time. In some embodiments, all monitoring time intervals are the same, as shown in FIG. 4a. Then the above graphic shown in FIG. 4a can be merged into a diagram shown in FIG. 4b by combining horizontal neighboring elements if the number of CPUs used at the horizontal neighboring elements is the same or similar. State differently, only when the number of CPU used changes or the changed number is in a predefined threshold, the number of CPU used, and the corresponding time are recorded. For example, {(0, t0, 6), (t0, t1, 2), (t1, t2, 4), (t2, t3, 2), (t3, t4,7)} can be used to express the diagram shown in FIG. 4b. In another example, {(t0, 6), (t1, 2), (t2, 4), (t3, 2), (t4,7)} also can be used to express the diagram shown in FIG. 4b. It is to be appreciated that any existing merging method can be used to get the diagram. According to FIG. 4b, the maximum number of CPUs required by the job is 7, and a duration to complete the job is 18 time units. In some embodiments, the above diagram can be directly recorded by a monitor. It also can be found that the duration to complete the job shown in FIG. 4a is t4 (18 time units), which can be obtained from the above diagram expression.

A backfill of the job corresponds to a time window during which there are resources unused by the job from the allocated maximum amount of resources. Then at least one backfill of a job corresponds to at least one time window, during each of which there are the resources unused by the job from the maximum amount of resources allocated to the job.

Figure 4C:
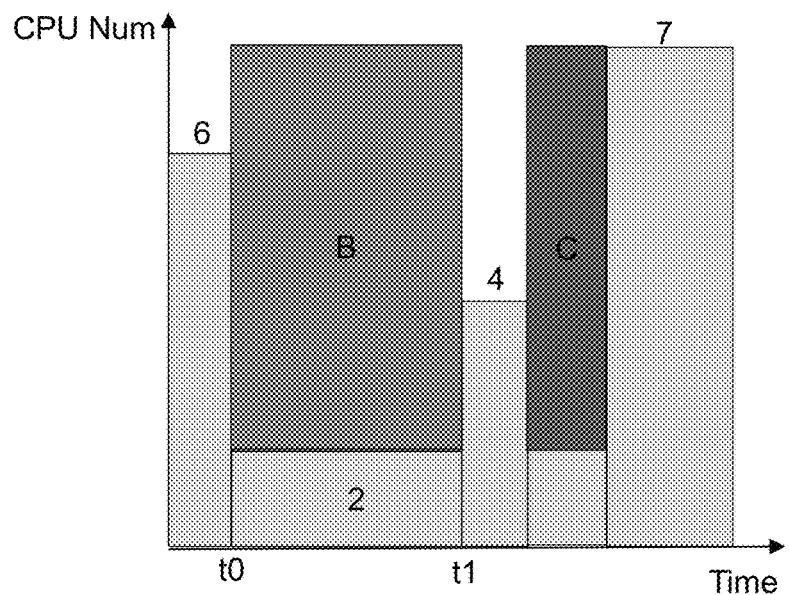
FIG. 4c depicts a backfill obtained from the diagram shown in FIG. 4b according to some embodiments of the present invention.

In some embodiments, both the amount of the resources unused by the first job during each time window of the at least one backfill and duration of each time window of the at least one backfill satisfy predefined requirements. FIG. 4c depicts a backfill B for the job shown in FIG. 4a, which is obtained from the diagram shown in FIG. 4b. Suppose that in the predefined requirements, number of CPUs unused by the job is greater than or equal to 4 and duration of the time window is greater than or equal to 5 time units. It can be found that number of CPUs unused by the job in the Block B is 5 (which is greater than 4) and duration of time window in the Block B is 7 time units (which is greater than 5 time units), the block B therefore can be determined to be the backfill B. However the Block C is not a backfill since the duration of the time window is 2 time units (which is not greater than 5 time units). In an example, the backfill B in FIG. 4c can be expressed as (5, t0, t1), wherein 5 represents number of CPUs unused by the job, t0 represents a start time point of the time window of the job, and t1 represents an end time point of the time window of the job.

Jobs in a same type may share same or similar diagram and backfill(s). So, data of historical jobs can be used to get a job classifier using existing methods such as statistical classification method, artificial neural network method by selecting suitable feature from data of jobs. The invention has no restrictions on the features and classification methods used by the classifier. When the job classifier is obtained, it can be used to classify a new job to a specified type. Those skilled in the art my understand that jobs in various fields have various types, for example, types for jobs in integrated circuit design may vary from types for jobs in banking. The invention has no limitation on the types of jobs.

Using the job classifier, a job can be classified into a type. A plurality of historical jobs in this type can be used to obtain at least one backfill of a job in the type using such as existing statistical methods.

In some embodiments, when the user submits the job, the user may specify the type of the job.

Figure 5:
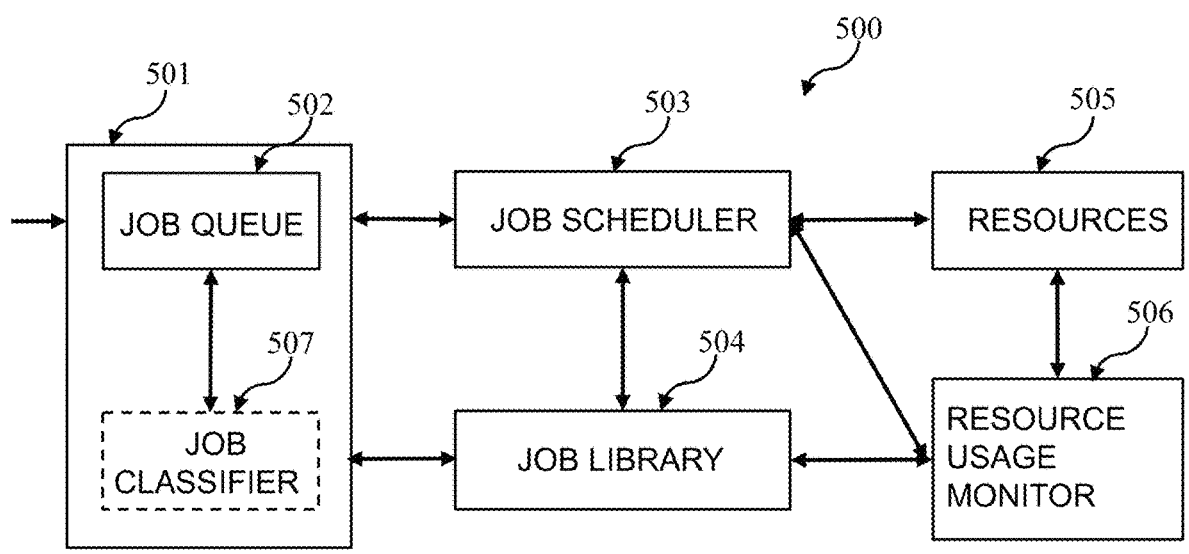
FIG. 5 depicts an exemplary usage environment according to some embodiments of the present invention.

Referring to FIG. 5, an exemplary usage environment 500 of the present invention is depicted according to some embodiments of this invention. Usage environment 500 may comprise job manager 501, job scheduler 503, job library 504, resources 505 and resource usage monitor 506. Job manager 501 may comprise job queue 502. All components are connected directly or indirectly via a communication network.

The communication network may include various types of communication networks, such as a wide area network (WAN), local area network (LAN), a telecommunication network, a wireless network, a public switched network and/or a satellite network. The communication network may include connections, such as wire, wireless communication links, or fiber optic cables. It may be appreciated that FIG. 4 provides only an illustration of one implementation and does not imply any limitations with regard to the environments in which different embodiments may be implemented. Many modifications to the depicted environments may be made based on design and implementation requirements.

In some embodiments, job library 504 may store existing resource usage information for all available job types. Table 1 shows exemplary resource usage information of all available job types stored in job library 504. Resource usage information may comprise various job types and backfills corresponding to each job type, and the like. It can be found that some type of job may has no backfill, such as type C job in Table 1. Other data, as readily apparent by one of ordinary skill in this and related arts, can be contained in the resource usage information, such as duration to complete the job type. All the data stored in job library 504 can be stored as, such as a table in database, an XML file, or any other data structure. And the data stored in the job library 504 can be searched by job manager 501, job scheduler 503 or resource usage monitor 506.

TABLE 1

| Job type | backfills | Duration to complete the job type |
|---|---|---|
| A | (CPU5, memory . . . , time0, time1) | d4 |
| B | (CPU3, memory . . . , time5, time6), (CPU4, memory . . . ,time7, time8) | d9 |
| C | | d11 |
| . . . | . . . | . . . |

In some embodiments, job queue 502 is a job buffer which may receive jobs from users and may queue the jobs based on job's input sequence. Information contained in a received job (a first job) may comprise maximum amount of resources required by the job input by the user. In some further embodiments, the information contained in the first job may further comprise type of the job input by the user. In some embodiments, job manager 501 may further comprise job classifier 507 which is obtained using data of historical jobs. If the user does not input the type of the job, job classifier 507 may classify the job to a specific type. Job manager 501 may manage each job from job queue 502 and resource usage information of each job from the job library 504. For example, after receiving the first job, the job manager 510 may add the first job to job queue 502. Job manager 501 may obtain job identification, maximum amount of resources required, and job type (which may be from the information contained in the first job or from job classifier 507), and then searches resource usage information of the job type for the first job. Then all information of jobs in job queue 502 can be managed in such as an exemplary Table 2. It can be understood that other data can be contained in the Table 2, such as duration to complete the job type. It will be further understood that the data in Table 2, similar to the information in Table 1, can be stored as, such as a table in database, an XML file, or any other data structure. And the data stored in job manager 501 can be searched by job scheduler 503.

| Job ID | Maximum amount of resources required | Job type | Backfills | Duration to complete the job type |
|---|---|---|---|---|
| Job1 | CPU: 5 memory . . . | A | (CPU5,memory..., time0, time1) | d4 |
| Job 2 | . . . | . . . | . . . | . . . |
| Job 3 | CPU: 4, memory . . . | C | | d12 |
| . . . | . . . | . . . | . . . | . . . |

In some embodiments, after receiving the first job from the output of the job queue 502, the job scheduler 503 may determine the maximum amount of resources required by the first job from information contained in the first job, and also determines type of the first job. In some embodiments, the job scheduler 503 may search data in the job library 504 to obtain at least one backfill of the first job based on the determined job type. In some embodiments, job scheduler 503 searches data in job manager 501 (such as data in Table 2) to obtain at least one backfill of the first job. Afterwards, job scheduler 503 may allocate the maximum amount of resources required by the first job from remaining resources in resources 505 to the first job.

In some embodiments, it is assumed that vector $M=\{m_i, i<=p\}$ is the respective amount of respective kinds of maximum amount of resources required by the first job, where p is the number of kinds of resources. A kind of resource can be CPU or memory, and another kind of resource can be license or disk. Job scheduler 503 may set up vector $N=\{n_i, i<=p\}$ as respective amount (counters) of respective kinds of current remaining resources. If each amount of each kind of remaining resources ($n_i$) is larger than or equal to each amount of each kind of maximum amount of resources required ($m_i$), e.g. $n_i>=m_i$, job scheduler 503 may decrease each counter $n_i$ by $m_i$ and then may instruct system to run the job. Then the amount of the remaining resources for system can be $N-M=\{n_i-m_i\}$.

In some embodiments, in order to fully utilize the backfill(s) of the first job, after some remaining resources have been allocated to the first job and it is determined that at least one backfill is contained in resource usage diagram of the first job during running, job scheduler 503 may contact job manager 501 to search a second job in waiting jobs (job queue 502) to be allocated resources by job scheduler 503 from data in job manager 501, the second job being suitable to be allocated resources from the maximum amount of resources allocated to the first job during at least one backfill.

In some embodiments, more jobs suitable to be allocated resources unused by the first job from the maximum amount of resources allocated to the first job during the at least one backfill may be searched from job manager 501, such as from Table 2. In an example, the priority of a job may be added to the information in Table 2. Then the job with highest priority may be selected as the second job. In another example, the job searched first may be selected as the second job. In yet another example, the second job may be selected randomly from the more jobs satisfying the requirements of the second job. Those skilled in the art may understand that other selection method may be applied too.

In some embodiments, that the second job is suitable to be allocated resources from the maximum amount of resources allocated to the first job during at least one backfill means that the maximum amount of resources required by the second job is less than or equal to the amount of resources unused by the first job during a time window of the at least one backfill. Then the second job may run by using the resource unused by the first job during the time window. In other words, the first job and the second job may run in parallel during the time window. For example, if there are three backfills for the first job, there may be only one backfill which may be suitable for the second job, and there may be two or three backfills which may be suitable for the second job. In this way, system resources may be saved.

Suppose that vector $B=\{b_i, i<=p,\}$ is the respective amount of respective kinds of resources in a backfill of the first job and vector $S=\{s_i, i<=q, q<=p\}$ is the respective amount of respective kinds of maximum amount of resources required by the second job, where p is the number of kinds of resources required by the second job and the resource kinds of the first job contains all the resource kinds of the second job ($q<=p$). If $s_i<=b_i$, $i<=q$, e.g. the respective amount of respective kinds of maximum amount of resources required by the second job ($s_i$) is less than or equal to the respective amount of respective kinds of resources in a backfill ($b_i$) of the first job, job scheduler 503 may allocate resources unused by the first job from the maximum amount of resources allocated to the first job to the second job, e.g. insert the second job to the backfill of the first job, when the first job runs to any time point, a start time point preferably, of a time window of the backfill.

In some embodiments, that the second job is suitable to be allocated resources from the maximum amount of resources allocated to the first job during at least one backfill means that the maximum amount of resources required by the second job being less than or equal to the amount of resources unused by the first job during each time window of the at least one backfill and duration to complete the second job being less than or equal to duration sum of all time windows of the at least one backfill. Then the second job may run totally by using the resource unused by the first job during the time window. In other words, the first job and the second job may run in parallel during each time window of the at least one backfill. When the last backfill of the at least one backfill of the first job ends, the second job finishes running.

Suppose that vector $B=\{b_i, i<=p,\}$ is the respective amount of respective kinds of resources in each backfill of the first job and vector S={$s_i$, i<=q, q<=p} is the respective amount of respective kinds of maximum amount of resources required by the second job, where p is the number of kinds of resources need by the second job and the resource kinds of the first job contains all the resource kinds of the second job (q<=p). If $s_i$<=$b_i$, i<=q, e.g. the respective amount of respective kinds of maximum amount of resources required by the second job ($s_i$) is less than or equal to the respective amount of respective kinds of resources in each backfill ($b_i$) of the first job, and duration to complete the second job is less than or equal to duration of the at least one backfill of the first job (e.g. duration sum of all time windows of the at least one backfill), job scheduler 503 may allocate resources unused by the first job from the maximum amount of resources allocated to the first job to the second job, e.g. insert the second job to each backfill of the first job, when the first job runs to a start time point of each time window of the at least one backfill.

In some embodiments, job scheduler 503 may allocate resources unused by the first job from the maximum amount of resources allocated to the first job to the second in response to the first job running to a start time point of a time window of the at least one backfill if the maximum amount of resources required by the second job is less than the amount of resources unused by the first job in the backfill and a cumulative sum of duration of each time window of the at least one backfill of the first job is greater than a predefined percentage of the duration to complete the second job, such as 80% of the duration to complete the second job, or a cumulative sum of duration of each time window of the at least one backfill of the first job is greater than a predefined time threshold, such as 10 seconds.

In some embodiments, the actual resource usage of jobs allocated system resources may be monitored by the resource usage monitor 506. After allocating system resources for the first job and determining the second job, job scheduler 503 may notify the information (such as information of backfills, etc) of the first job and may instruct the resource usage monitor 506 to monitor resource usage of the first job. Suppose that vector K={$k_i$, i<=p} is the respective amount of respective kinds of actual resources used by the first job, where p is the number of kinds of resources. The amount of the remaining resources for system is N-K={$n_i$-$k_i$}, and $n_i$-$k_i$>$n_i$-$m_i$. Thus, once the resource usage monitor 506 notifies job scheduler 503 that the first job runs to a start time point of a/each time window of the at least one backfill, job scheduler 503 may allocate remaining resource (N-K) of the system, which is the resources unused by the first job, e.g. the resources in the backfill (B), by the first job from the maximum amount of resources allocated to the first job (M) to the second job until the remaining resource N-K of the system arrives at N-M. The first job and the second job may run concurrently during the/each time window of the at least one backfill of the first job. And once the resource usage monitor 506 notifies job scheduler 503 that the first job runs to an end time point of the/each time window of the at least one backfill, job scheduler 503 may re-allocate the resource allocated to the second job back to the first job. In some embodiments, job scheduler 503 may re-allocate the resource allocated to the second job back to the first job at any time point of the/each time window of the at least one backfill.

In some embodiments, the first job may comprise more than one backfills, such as two backfills. Job scheduler 503 may allocate resources unused by the first job from the maximum amount of resources allocated to the first job to the second job when the first job runs to a start time point of time window of the first backfill, and when the first job runs to an end time point of time window of the first backfill, the job scheduler may re-allocate the resources allocated to the second job back to the first job. In addition, job scheduler 503 may allocate resources unused by the first job from the maximum amount of resources allocated to the first job to a third job when the first job runs to a start time point of time window of a second backfill, and when the first job runs to an end time point of time window of the second backfill, the job scheduler may re-allocate the resources allocated to the third job back to the first job.

In some embodiments, the resource usage monitor 506 may return monitored data of jobs to job library 504 to refine the data stored in job library 504.

Job manager 501, job schedule 503 or resource usage monitor 506 may be, for example, a mobile device, a telephone, a personal digital assistant, a netbook, a laptop computer, a tablet computer, a desktop computer, or any type of computing device capable of running a program and accessing a network. Job queue 502 or job classification library 504 may be a database or any other data structure, such as file, table and the like. The components 501-505 may operate in a cloud computing service model, such as Software as a Service (SaaS), Platform as a Service (PaaS), or Infrastructure as a Service (IaaS). The components 501-505 may also be located in a cloud computing deployment model, such as a private cloud, community cloud, public cloud, or hybrid cloud.

Figure 6:
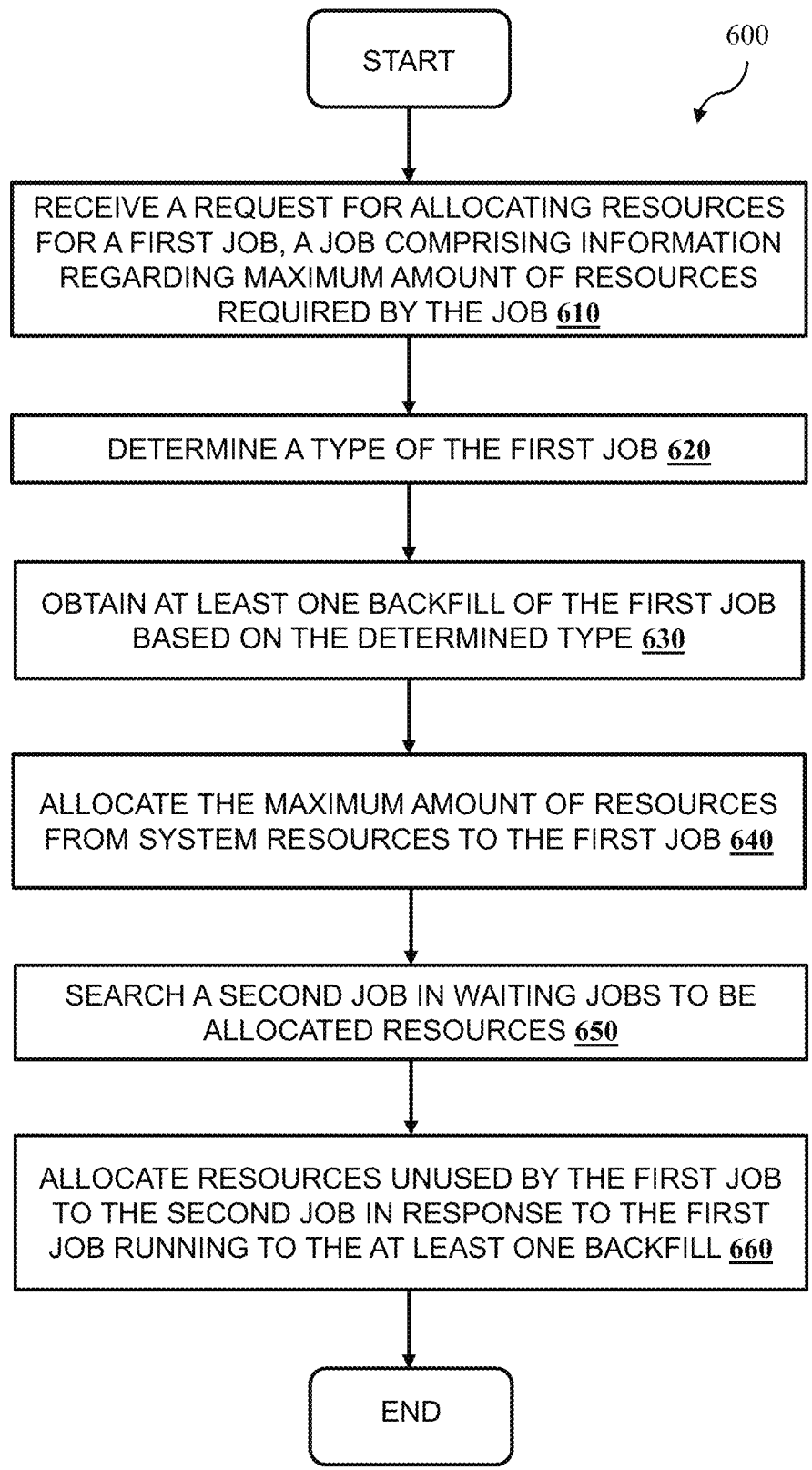
FIG. 6 depicts an operational flowchart for scheduling jobs according to some embodiments of the present invention.

FIG. 6 depicts operational flowchart 600 for scheduling jobs according to some embodiments of the present invention. The method may be implemented by a job scheduler. According to the method, at step 610, a job scheduler may receive a request for allocating resources for a first job, a job (either the first job or the second job) comprising information regarding maximum amount of resources required by the job. In some embodiments, the resource may comprise single one or a combination from a group of: CPU, GPU, memory, software licenses, network bandwidth, disk.

At step 620, the job scheduler may determine a type of the first job. In some embodiment, a type of a job may be input by a user submitting the job. In some embodiments, the type of the first job may be obtained from the job classifier 507.

At step 630, the job scheduler may obtain at least one backfill of the first job based on the determined type, where the at least one backfill corresponds to at least one time window, during each of which there are the resources unused by the first job from the maximum amount of resources allocated to the first job. In some embodiments, both the amount of the resources unused by the first job during each time window of the at least one backfill and duration of each time window of the at least one backfill satisfy predefined requirements. In some embodiments, the at least one backfill of the first job may be obtained based on resource usage diagram of jobs with the same type as the first job, which is obtained from history resource usage information of jobs of the same type as the first job.

At step 640, the job scheduler may allocate the maximum amount of resources of resources from system resources to the first job.

At step 650, the job scheduler may search a second job in waiting jobs to be allocated resources, the second job being suitable to be allocated resources unused by the first job from the maximum amount of resources allocated to the first job during the at least one backfill. In some embodiments, the maximum amount of resources required by the second job is less than or equal to the amount of resources unused by the first job during a time window of the at least one backfill. In some embodiments, the maximum amount of resources required by the second job is less than or equal to the amount of resources unused by the first job during each time window of the at least one backfill and duration to complete the second job is less than or equal to duration sum of all time windows of the at least one backfill.

At step 660, the job scheduler may allocate resources unused by the first job from the maximum amount of resources allocated to the first job to the second job in response to the first job running to the at least one backfill (maybe at any time point of a/each time window of the at least one backfill). In some embodiments, the job scheduler may allocate resources unused by the first job from the maximum amount of resources allocated to the first job to the second job in response to the first job running to a start time point of a/each time window of the at least one backfill. In some embodiments, actual resource usage of jobs allocated system resources are monitored.

At step 670 which is not shown in FIG. 6, if the first job runs to an end time point of the/each time window of the at least one backfill, the job scheduler may re-allocate resources allocated to the second job back to the first job.

It will be noted that, although the terms first, second, etc. may be used herein to describe various elements, these elements should not be limited by these terms. These terms are only used to distinguish one element from another element. Thus, a first element discussed below could be termed a second element without departing from the scope of the present concept.

It should be noted that the method or the system for scheduling jobs according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a request for allocating resources for a first job, a job comprising information regarding maximum amount of resources required by the job;
   determining, by the one or more processors, a type of the first job;
   obtaining, by the one or more processors, at least one backfill of the first job based on the determined type;
   allocating, by the one or more processors, the maximum amount of resources from system resources to the first job;
   tracking, by the one or more processors, resources unused by the first job;
   searching, by the one or more processors, a second job in waiting jobs to be allocated resources, the second job being suitable to be allocated the resources unused by the first job from the maximum amount of resources allocated to the first job during the at least one backfill; and
   allocating, by the one or more processors, the resources unused by the first job from the maximum amount of resources allocated to the first job to the second job in response to the first job running to the at least one backfill.

2. The method of claim 1, wherein the at least one backfill corresponds to at least one time window, during each of which there are the resources unused by the first job from the maximum amount of resources allocated to the first job.

3. The method of claim 2, wherein both the amount of the resources unused by the first job during each time window of the at least one backfill and duration of each time window of the at least one backfill satisfy predefined requirements.

4. The method of claim 2, wherein maximum amount of resources required by the second job is less than or equal to the amount of resources unused by the first job during a time window of the at least one backfill.

5. The method of claim 2, wherein maximum amount of resources required by the second job is less than or equal to the amount of resources unused by the first job during each time window of the at least one backfill and duration to complete the second job being less than or equal to duration sum of all time windows of the at least one backfill.

6. The method of claim 2, wherein allocating the resources unused by the first job to the second job in response to the first job running to the at least one backfill comprises:
   allocating, by the one or more processors, the resources unused by the first job from the maximum amount of resources allocated to the first job to the second job in response to the first job running to a start time point of a time window of the at least one backfill.

7. The method of claim 6, wherein allocating the resources unused by the first job to the second job in response to the first job running to the at least one backfill comprises:
   re-allocating, by the one or more processors, resources allocated to the second job back to the first job in response to the first job running to an end time point of the time window of the at least one backfill.

8. The method of claim 1, wherein the at least one backfill of the first job is obtained based on resource usage diagram of jobs with the same type as the first job, which is obtained from history resource usage information of jobs of the same type as the job.

9. A system comprising:
   one or more processors;
   a memory coupled to at least one of the processors; and
   a set of computer program instructions stored in the memory and executed by at least one of the processors in order to perform actions of:
   receiving a request for allocating resources for a first job, a job comprising information regarding maximum amount of resources required by the job;
   determining a type of the first job;
   obtaining at least one backfill of the first job based on the determined type;
   allocating the maximum amount of resources of resources from system resources to the first job;
   tracking resources unused by the first job;
   searching a second job in waiting jobs to be allocated resources, the second job being suitable to be allocated the resources unused by the first job from the maximum amount of resources allocated to the first job during the at least one backfill; and
   allocating the resources unused by the first job from the maximum amount of resources allocated to the first job to the second job in response to the first job running to the at least one backfill.

10. The system of claim 9, wherein the at least one backfill corresponds to at least one time window, during each of which there are the resources unused by the first job from the maximum amount of resources allocated to the first job.

11. The system of claim 10, wherein both the amount of the resources unused by the first job during each time window of the at least one backfill and duration of each time window of the at least one backfill satisfy predefined requirements.

12. The system of claim 9, wherein maximum amount of resources required by the second job is less than or equal to the amount of resources unused by the first job during a time window of the at least one backfill.

13. The system of claim 9, wherein allocating the resources unused by the first job to the second job in response to the first job running to the at least one backfill comprises:
   allocating the resources unused by the first job from the maximum amount of resources allocated to the first job to the second job in response to the first job running to a start time point of a time window of the at least one backfill.

14. The system of claim 13, wherein allocating the resources unused by the first job to the second job in response to the first job running to the at least one backfill comprises:
   re-allocating resources allocated to the second job back to the first job in response to the first job running to an end time point of the time window of the at least one backfill.

15. A computer program product, comprising a computer-readable storage medium having program instructions stored thereon, the program instructions executable by one or more processors in a load balancer cluster which comprises a plurality of load balancers and an assistant, to cause the one or more processors to perform actions of:
   receiving a request for allocating resources for a first job, a job comprising information regarding maximum amount of resources required by the job;
   determining a type of the first job;
   obtaining at least one backfill of the first job based on the determined type;
   allocating the maximum amount of resources of resources from system resources to the first job;
   tracking resources unused by the first job;
   searching a second job in waiting jobs to be allocated resources, the second job being suitable to be allocated the resources used by the first job from the maximum amount of resources allocated to the first job during the at least one backfill; and
   allocating the resources unused by the first job from the maximum amount of resources allocated to the first job to the second job in response to the first job running to the at least one backfill.

16. The computer program product of claim 15, wherein the at least one backfill corresponds to at least one time window, during each of which there are the resources unused by the first job from the maximum amount of resources allocated to the first job.

17. The computer program product of claim 15, wherein both the amount of the resources unused by the first job during each time window of the at least one backfill and duration of each time window of the at least one backfill satisfy predefined requirements.

18. The computer program product of claim 15, wherein maximum amount of resources required by the second job is less than or equal to the amount of resources unused by the first job during a time window of the at least one backfill.

19. The computer program product of claim 15, wherein allocating the resources unused by the first job to the second job in response to the first job running to the at least one backfill comprises:
   allocating the resources unused by the first job from the maximum amount of resources allocated to the first job to the second job in response to the first job running to a start time point of a time window of the at least one backfill.

20. The computer program product of claim 19, wherein allocating the resources unused by the first job to the second job in response to the first job running to the at least one backfill comprises:
   re-allocating resources allocated to the second job back to the first job in response to the first job running to an end time point of the time window of the at least one backfill.

* * * * *